(12) United States Patent
Löffelholz et al.

(10) Patent No.: US 8,951,328 B2
(45) Date of Patent: Feb. 10, 2015

(54) PRODUCTION OF VALVE METAL POWDERS

(75) Inventors: Josua Löffelholz, Langelsheim (DE); Frank Behrens, Goslar (DE); Siegfried Schmieder, Goslar (DE)

(73) Assignee: H.C. Starck GmbH (DE)

( * ) Notice: Subject to any disclaimer, the term of this patent is extended or adjusted under 35 U.S.C. 154(b) by 1384 days.

(21) Appl. No.: 11/721,276

(22) PCT Filed: Dec. 9, 2004

(86) PCT No.: PCT/EP2004/013987
§ 371 (c)(1),
(2), (4) Date: Sep. 5, 2007

(87) PCT Pub. No.: WO2006/061040
PCT Pub. Date: Jun. 15, 2006

(65) Prior Publication Data
US 2008/0087138 A1    Apr. 17, 2008

(51) Int. Cl.
| | | |
|---|---|---|
| *B22F 1/00* | (2006.01) | |
| *B22F 9/00* | (2006.01) | |
| *C21B 15/04* | (2006.01) | |
| *C22B 5/20* | (2006.01) | |
| *C22C 1/04* | (2006.01) | |
| *B22F 9/24* | (2006.01) | |
| *C22B 5/00* | (2006.01) | |
| *C22B 34/24* | (2006.01) | |
| *H01G 9/052* | (2006.01) | |

(52) U.S. Cl.
CPC . *C22C 1/045* (2013.01); *B22F 9/24* (2013.01); *C22B 5/00* (2013.01); *C22B 34/24* (2013.01); *H01G 9/0525* (2013.01)
USPC .............................................. 75/343; 75/363

(58) Field of Classification Search
None
See application file for complete search history.

(56) References Cited

U.S. PATENT DOCUMENTS

| 4,582,530 A * | 4/1986 | Heinrich et al. ............... 420/424 |
| 4,684,399 A * | 8/1987 | Bergman et al. ................. 75/363 |
| 5,442,978 A | 8/1995 | Hildreth et al. |

FOREIGN PATENT DOCUMENTS

DE    3330455 A1    3/1985

\* cited by examiner

*Primary Examiner* — Yoshitoshi Takeuchi
(74) *Attorney, Agent, or Firm* — Drinker Biddle & Reath LLP

(57) ABSTRACT

The invention relates to the production of valve metal powders, in particular, tantalum powders by reduction of a corresponding valve metal compound, for example, $K_2TaF_7$, with an alkali metal in the presence of a diluent salt, whereby the reduction is carried out in the presence of a particle diminution agent, preferably, $Na_2SO_4$, which is added to the reaction mixture continuously or in aliquots.

20 Claims, No Drawings

PRODUCTION OF VALVE METAL POWDERS

CROSS-REFERENCE TO RELATED APPLICATIONS

This application is a national stage application (under 35 U.S.C. §371) of PCT/EP2004012987 filed Dec. 9, 2004.

BACKGROUND OF THE INVENTION

The invention relates to a process for producing valve metal powders, in particular tantalum powders, by reduction of a suitable valve metal compound with an alkali metal, the reduction being carried out in the presence of a grain-refining agent which is added in portions or continuously.

Valve metals, which are to be understood as meaning in particular tantalum and its alloys, as well as other metals from Group IVb (Ti, Zr, Hf), Vb (V, Nb, Ta) and VIb (Cr, Mo, W) of the periodic system of the elements and alloys thereof, are in widespread use in component manufacture. The use of niobium or tantalum for the production of capacitors should be particularly emphasised.

The starting point for the production of niobium or tantalum capacitors is usually corresponding metal powders, which are initially pressed and then sintered in order to obtain a porous body. The latter is anodised in a suitable electrolyte, so that a dielectric oxide film is formed on the sintered body. The physical and chemical properties of the metal powders used have a crucial influence on the properties of the capacitor. Crucial characteristics include, for example, the specific surface area and the level of impurities.

Tantalum powder of a quality which allows it to be used to produce capacitors is usually produced by sodium reduction of $K_2TaF_7$. In this process, $K_2TaF_7$ is placed in a retort and is reduced by liquid sodium. In this reaction, it is particularly important to control the grain size and therefore the specific surface area, since these properties determine the specific capacitance of the capacitors produced therefrom. The finer the grain, the higher the specific charge.

It is known from U.S. Pat. No. 5,442,978 that the grain fineness can be influenced by the following factors:
1. A high reaction temperature results in more rapid grain growth and therefore in the formation of a coarser grain.
2. An excess of reducing agent during the reaction leads to the formation of a large number of crystallisation nuclei. Rapid addition of sodium is therefore advantageous.
3. A high dilution of $K_2TaF_7$ in a molten salt leads to the formation of a large number of individual crystallisation nuclei and is therefore advantageous.

Therefore, to produce tantalum powder with a high specific surface area, U.S. Pat. No. 5,442,978 proposes the production of highly dilute $K_2TaF_7$ by the stepwise addition of sodium, the addition being carried out at a high rate. There are no details as to the specific surface areas which can be obtained using this process. During this process, non-uniform concentration ratios of the reactants occur during the reaction. The $K_2TaF_7$ concentration is initially high but drops constantly as the sodium is added, so that the grain size distribution of the powder which is formed is very wide.

According to U.S. Pat. No. 4,684,399 it is advantageous for the tantalum compound to be added continuously or in steps during the reduction. As a result of this measure, the concentration of tantalum compound remains more uniform during the reduction process. It is also preferable for the reducing agent sodium to be added continuously or in steps.

DE 33 30 455 A1 also describes a process for producing valve metal powders with the objective of obtaining powders with a fine grain size and a large surface area. For this purpose, a reaction mixture comprising reduction metal and double fluorine salt of the valve metal is reacted in the presence of a doping element. The proposed doping element is elemental sulfur or a sulfur compound, for example $Na_2SO_4$. The reaction partners are introduced together and reacted in a batch reaction. The valve metal powders obtained have BET surface areas of up to 0.64 $m^2/g$.

BRIEF SUMMARY OF THE INVENTION

The object of the present invention is to provide a process for producing valve metal powders which is distinguished by a high throughput and, at the same time, an improved quality, in particular a high specific surface area of the powders obtained.

The object is achieved by the reduction of a valve metal compound being carried out in the presence of a grain-refining agent, which is added in portions or continuously.

The present invention therefore provides a process for producing valve metal powders by reduction of a valve metal compound with an alkali metal in the presence of a diluting salt, wherein the reduction takes place in the presence of a grain-refining agent which is added in portions or continuously.

The process according to the invention makes it possible to produce valve metal powders with a high throughput. The addition of the grain-refining agent in portions or continuously ensures that the fluctuation in the concentration of grain-refining agent during the reduction process is minimised. It has been found that this is a crucial factor in obtaining valve metal powders which are distinguished by a high specific surface area and a narrow particle size distribution.

DETAILED DESCRIPTION OF THE INVENTION

The process according to the invention is suitable for the production of a very wide range of valve metal powders. However, it is preferable to produce niobium or tantalum powder, particularly preferably tantalum powder.

Therefore, the valve metal is preferably tantalum. Examples of tantalum-containing valve metal compounds which can be used include $K_2TaF_7$, $Na_2TaF_7$, $TaCl_5$ or mixtures thereof. It is preferable to use $K_2TaF_7$.

Suitable diluting salts are known to the person skilled in the art. Examples which may be mentioned include NaCl, KCl, KF or mixtures thereof. It is preferable for the diluting salt to be introduced into the reactor before the reaction between the valve metal compound and alkali metal takes place. The diluting salt is preferably used in a quantity from 40 to 80 wt. %, based on the sum of the quantities of valve metal compound, alkali metal and diluting salt.

According to the invention, the reducing agent used is alkali metal. Examples of suitable alkali metals are Na, K or mixtures or alloys thereof. Reduction is preferably carried out using sodium. The total quantity of alkali metal used is preferably from 0.9 to 1.5 times, particularly preferably 1 to 1.05 times, the quantity which is stoichiometrically required for complete reduction of the valve metal compound.

The alkali metal can be added to the reactor in one portion before the reduction reaction commences. However, it is preferable for the alkali metal to be added continuously or in portions during the reduction. The rate at which the alkali metal is added can be controlled in a targeted fashion in relation to the rate at which valve metal compound is added, in order to set the desired powder properties, in particular the particle size.

The valve metal compound can also be added to the reactor in a single portion before the reduction reaction commences. However, it is preferable for this compound also to be added continuously or in portions during the reduction.

The total quantity of valve metal compound and alkali metal is preferably 20 to 60 wt. %, based on the sum of the quantities of valve metal compound, alkali metal and diluting salt.

Examples of a grain-refining agent which can be used include a sulfur-containing compound, a phosphorus-containing compound, a boron-containing compound and/or a silicon-containing compound. Examples of suitable sulfur-containing grain-refining agents include sulfur, potassium sulfate, potassium sulfite, potassium sulfide, sodium sulfate, sodium sulfite, sodium sulfide or tantalum sulfide. Examples of suitable phosphorus-containing grain-refining agents include sodium or potassium phosphates, phosphorus, phosphides. Examples of suitable boron-containing grain-refining agents include borax, $KBF_4$, $NaBF_4$ or borides, and examples of suitable silicon-containing grain-refining agents include silica, silicates or silicon nitride.

Preferred grain-refining agents are sulfur, alkali metal sulfate, alkali metal sulfite, alkali metal sulfide and/or tantalum sulfide, with $Na_2SO_4$ being particularly preferred.

The total quantity of grain-refining agent used is preferably 0.01 to 2 wt. %, particularly preferably 0.02 to 0.4 wt. %, based on the sum of the quantities of valve metal compound, alkali metal and diluting salt.

According to the invention, the grain-refining agent is added in portions or continuously. The addition is preferably carried out in at least two portions. The first portion can already have been added to the reactor before the reduction begins.

It is particularly preferable for the grain-refining agent to be metered in from 2 to 50 identically sized portions. It is particularly preferably added together with the valve metal compound.

If grain-refining agents which evaporate at the reduction temperatures, such as for example sulfur or phosphorus, are used, it should be ensured that they are added to a reaction mixture which includes an excess of alkali metal. In this case, the grain-refining agent is preferably added in each case immediately after the alkali metal has been added.

If the process is to be carried out continuously, the procedure can, for example, be for the reacted melt to be drained off via a bottom outlet or a heated siphon tube.

The reduction is preferably carried out at a temperature of from 800 to 1000° C. First of all, the reaction mixture has to be heated until the reduction begins. Since the reduction is highly exothermic, it may be necessary for the reaction mixture to be cooled during the reduction.

The process according to the invention can be carried out in known reactors, such as those described, for example, in U.S. Pat. No. 4,684,399 and U.S. Pat. No. 5,442,978.

In a particular embodiment of the process according to the invention, the entire quantity of diluting salt is introduced as initial charge and a first portion of valve metal compound and grain-refining agent is added. This mixture is heated to the reduction temperature before the reduction is started by addition of a first portion of alkali metal. Then, further portions of valve metal compound and alkali metal are metered in alternately, with further grain-refining agent also being added at the same time as the valve metal compound. The reaction temperature is kept as constant as possible by heating and/or cooling. The quantity and/or addition rate is/are preferably selected in such a way that the concentration of the three components, namely valve metal compound, alkali metal and grain-refining agent, fluctuates as little as possible over the entire duration of the reduction. The result is a powder which has a narrow grain size distribution. The components valve metal compound, alkali metal and grain-refining agent are preferably added in constant quantities, with the rate at which they are added being selected in such a way that a further portion of a component is added whenever this component has been virtually completely, for example 95%, reacted. This embodiment can also be modified by introducing a first portion of alkali metal in the diluting salt and starting the reduction by the addition of valve metal compound and grain-refining agent. In this case, therefore, the addition sequence is reversed.

In a further embodiment, the reduction is carried out semi-continuously, with the diluting salt being introduced into a reactor and valve metal compound and alkali metal being metered in alternately, with the quantity of the valve metal compound which is metered in each case corresponding in stoichiometric terms to a multiple of the quantity of the alkali metal which is metered in. The grain-refining agent is once again preferably metered in at the same time as the valve metal compound.

In this case, it is preferable for the quantity of valve metal compound and grain-refining agent which is in each case metered in to be increased proportionally to the quantity of diluting salt in the reactor, which has been increased by the reduction, or for the metering frequency to be increased accordingly, with the quantity of valve metal compound per portion metered in being lowered, towards the end of the reduction, to the stoichiometric quantity of alkali metal metered in.

The process according to the invention makes it possible to produce powders with small primary particles, i.e. a high specific surface area and a narrow particle size distribution. It is assumed that the following mechanism is exploited in this context:

1. The reduction takes place considerably more quickly than the tantalum crystal formation, i.e. the breaking down of the supersaturation of dissolved tantalum in the diluting salt brought about by the reduction.
2. The stepwise metering of double fluoride and reduction metal into the diluting salt produces a periodic supersaturation, in which case the degree of supersaturation immediately following the metering should be sufficient for the formation of tantalum crystal nuclei.
3. The grain-refining agent, on existing tantalum crystals, occupies "semi-crystal positions", i.e. locations on the crystal surface at which the growth takes place so that further crystal growth is impeded.
4. More strongly curved surfaces, i.e. smaller crystals, have, based on the surface area, a considerably greater number of semi-crystal positions than larger crystals. Therefore, on account of the lower concentration of the grain-refining agent, the growth of smaller crystals is impeded to a lesser extent than the growth of the large crystals.

This mechanism is based on theoretical considerations which are intended to explain the advantages of the process according to the invention. Irrespective of whether or not these considerations are valid, the mechanism indicated is not intended to be understood as restricting the inventive idea.

The reaction product obtained is processed in a known way. For this purpose, the reaction material is cooled. The cooling preferably takes place in an argon atmosphere, in order to prevent the valve metal powder from taking up nitrogen or oxygen. Then, the reaction material, optionally after a comminution step, is leached and washed using a suitable solvent, for example water, in order to remove diluting salt and as far as possible grain-refining agent or its decomposition products and to obtain the valve metal powder. The valve metal powder can then be dried and processed further in any desired way.

The following examples are intended to explain the invention in more detail, the intention being for the examples to make it easier to understand the principle of the invention, and are not to be understood as representing any restriction thereof.

EXAMPLES

The specific surface areas given in the examples were determined using the known Brunauer, Emmett and Teller method (BET method) using a Micrometrics Tristar 3000 appliance, and the oxygen contents were determined by means of a Leco TC-436 gas analyser.

Example 1

Comparative Example 150 kg of $K_2TaF_7$, 150 kg each of KCl and KF and 300 g of $Na_2SO_4$ were melted in a nickel-plated reactor made from the nickel-chromium alloy Inconel® and were reacted at 900° C. with 50 kg of liquid sodium in portions, 16 portions comprising a quantity of 3 kg and the final portion comprising a quantity of 2 kg. The portions were metered in such a way that the temperature was kept constant to within +/−10° C. After the reaction material had cooled, the salt was washed out using water 65 kg of Ta powder with a specific BET surface area of 1.5 $m^2/g$ and an O content of 5000 ppm were obtained.

Example 2

Comparative Example 150 kg of $K_2TaF_7$, 150 kg each of KCl and KF and 600 g of $Na_2SO_4$ were melted in a nickel-plated reactor made from the nickel-chromium alloy Inconel® and were reacted at 900° C. with 50 kg of liquid sodium in portions, 16 portions comprising a quantity of 3 kg and the final portion comprising a quantity of 2 kg. The portions were metered in in such a way that the temperature was kept constant to within +/−10° C. After the reaction material had cooled, the salt was washed out using water. 65 kg of Ta powder with a specific BET surface area of 1.55 $m^2/g$ and an O content of 5200 ppm were obtained. This example shows that the BET surface area of the Ta powder obtained is scarcely increased by increasing the quantity of the grain-refining agent used ($Na_2SO_4$).

Example 3

150 kg of $K_2TaF_7$, 150 kg each of KCl and KF and 300 g of $Na_2SO_4$ were melted in a nickel-plated reactor made from the nickel-chromium alloy Inconel® and were reacted at 900° C. with 50 kg of liquid sodium in portions, 16 portions comprising a quantity of 3 kg and the final portion comprising a quantity of 2 kg. During the reaction, a further 15 portions, in each case comprising 20 g of the grain-refining agent $Na_2SO_4$ were metered in, these portions in each case being added after an addition of sodium. The portions were metered in in such a way that the temperature was kept constant to within +/−10° C. After the reaction material had cooled, the salt was washed out using water. 65 kg of Ta powder with a specific BET surface area of 1.9 $m^2/g$ and an O content of 5600 ppm were obtained. This example shows that the BET surface area of the product can be considerably increased by adding the grain-refining agent in portions in accordance with the invention.

Example 4

250 kg of $K_2TaF_7$, 150 kg each of KCl and KF and 450 g of $Na_2SO_4$ were melted in a nickel-plated reactor made from the nickel-chromium alloy Inconel® and were reacted at 900° C. with 75.6 kg of liquid sodium in portions, 25 portions comprising a quantity of 3 kg and the final portion comprising a quantity of 0.6 kg. The portions were metered in in such a way that the temperature was kept constant to within +/−10° C. After the first 13 portions of sodium had been added, a further 450 g of $Na_2SO_4$ were added. After the reaction material had cooled, the salt was washed out using water. 110 kg of Ta powder with BET 1.5 $m^2/g$, O 5000 ppm were obtained. A comparison with Example 1 shows that, despite a considerably increased quantity of valve metal compound to be reacted, it is possible to obtain a product with the same BET surface area.

Example 5

250 kg of $K_2TaF_7$, 150 kg each of KCl and KF and 450 g of $Na_2SO_4$ were melted in a nickel-plated reactor made from the nickel-chromium alloy Inconel® and were reacted at 900° C. with 75.6 kg of liquid sodium in portions, 25 portions comprising a quantity of 3 kg and the final portion comprising a quantity of 0.6 kg. The portions were metered in in such a way that the temperature was kept constant to within +1-10° C. A further portion of grain-refining agent was added after every second addition of sodium. At the start of the reduction, the quantity of the further portion was 146 g, and this quantity dropped continuously to 12.3 g as the reaction progressed. After the reaction material had cooled, the salt was washed out using water. 110 kg of Ta powder with BET 1.5 $m^2/g$, O 5000 ppm were obtained. A comparison with Example 1 shows that, despite a considerably increased quantity of valve metal compound to be reacted, it is possible to obtain a product with the same BET surface area.

Example 6

150 kg of $K_2TaF_7$, 150 kg each of KCl and KU and 300 g of $Na_2SO_4$ were reacted with 50 kg of liquid sodium in a nickel-plated reactor made from the nickel-chromium alloy Inconel®. 15 kg of $K_2TaF_7$, 30 g of $Na_2SO_4$ and the entire quantity of KCl and KU were introduced as initial charge and heated to 900° C. The reduction was then started by the addition of 2.5 kg of sodium. Then, 9 times 15 kg of $K_2TaF_7$ and 30 g of $Na_2SO_4$ and 19 times 2.5 kg of sodium were added alternately, with each addition of valve metal compound and grain-refining agent being followed by the addition of two portions of sodium. The portions were metered in in such a way that the temperature was kept constant to within +/−10° C. After the reaction material had cooled, the salt was washed out using water. 65 kg of Ta powder with BET 1.9 $m^2/g$, O 6000 ppm were obtained. A comparison with Example 1 shows that if equal quantities are reacted, the procedure according to the invention leads to powder with a significantly higher specific surface area.

Example 7

Example 6 was repeated, but the sodium was added in 10 portions of 5 kg and the addition sequence was reversed.

Therefore, 5 kg of sodium and the entire quantity of KCl and KF were introduced as initial charge and heated to 900° C. Then, 10 portions each comprising 15 kg of $K_2TaF_7$ and 30 g of $Na_2SO_4$ and a further 9 portions comprising 5 kg of sodium were added, $K_2TaF_7$ and $Na_2SO_4$ in each case being added together alternately with sodium. The portions were metered in in such a way that the temperature was kept constant to within +/−10° C. After the reaction material had cooled, the salt was washed out using water. 65 kg of Ta powder with a BET surface area of 2.3 $m^2/g$ and an O content of 7500 ppm were obtained. A comparison with Example 1 shows that, even when sodium is introduced as initial charge, the procedure according to the invention leads to powder with a significantly higher specific surface area.

Example 8

125 kg of $K_2TaF_7$, 125 kg each of KCl and KF and 350 g of $Na_2SO_4$ were melted in a nickel-plated reactor made from the nickel-chromium alloy Inconel® and were reacted at 900° C. with 36 kg of liquid sodium in portions, each portion comprising a quantity of 3 kg. Then, a further 125 kg of $K_2TaF_7$ and 350 g of $Na_2SO_4$ were added and reduced with 39.6 kg of sodium in portions, each portion, with the exception of the final portion, in turn comprising a quantity of 3 kg. After the reaction material had cooled, the salt was washed out using water. 110 kg of Ta powder with BET 1.5 $m^2/g$, O 5000 ppm were obtained. A comparison with Example 1 shows that, despite a considerably increased quantity of valve metal compound to be reacted, it is possible to obtain a product with the same BET surface area.

Example 9

Example 8 was repeated, except that this time only 2×300 g of $Na_2SO_4$ were used and the second portion of $K_2TaF_7$ was not added in solid form, but rather was melted at 800° C. in a separate vessel and transferred into the reactor via a pipeline. 110 kg of Ta powder with BET 1.9 $m^2/g$, O 6800 ppm were obtained. A comparison with Example 1 shows that, despite a considerably increased quantity of valve metal compound to be reacted, it is possible to obtain a product with a higher BET surface area.

Example 10

150 kg of $K_2TaF_7$, 150 kg each of KCl and KF and 500 g of $Na_2SO_4$ were reacted with 50 kg of liquid sodium in a nickel-plated reactor made from the nickel-chromium alloy Inconel® at 850° C. $K_2TaF_7$ was added in liquid form. For this purpose, it was melted in a separate vessel at 700° C. and metered into the reactor via a pipeline. $K_2TaF_7$, $Na_2SO_4$ and liquid sodium were added in each case in 10 identically sized portions, $K_2TaF_7$ and $Na_2SO_4$ in each case being metered in together, alternating with the sodium. Each portion of 15 kg of $K_2TaF_7$ was metered in over the course of 1-2 minutes. In each case 5 kg of liquid sodium were metered in over the course of 20 seconds. Intensive mixing ensured that both reactants were fully dispersed before reaction occurred. The temperature was kept at 850° C. +/−110° C. by intensive cooling and by breaks between the individual metering steps. After the reaction material had cooled, the salt was washed out using water. 65 kg of Ta powder with a BET surface area of 3.0 $m^2/g$ and an O content of 10000 ppm were obtained.

The invention claimed is:

1. A process for producing valve metal powders which have a high BET surface area of at least 1.5 $m^2/g$ which comprises reducing a valve metal compound with an alkali metal in the presence of a diluting salt, wherein the reduction takes place in the presence of a grain-refining agent which is metered in at least two portions and wherein between metering in the at least two portions of said grain-refining agent at least a portion of said alkali metal is added, or said grain-refining agent is added continuously together with portions of said valve metal compound.

2. The process according to claim 1, wherein the valve metal is tantalum and the valve metal compound used is $K_2TaF_7$, $Na_2TaF_7$ or mixtures thereof.

3. The process according to claim 1, wherein the alkali metal used is Na, K or mixtures or alloys thereof.

4. The process according to claim 1, wherein the grain-refining agent is a sulfur-containing compound, a phosphorus-containing compound, a boron-containing compound and/or a silicon-containing compound.

5. The process according to claim 1, wherein the grain-refining agent is sulfur, alkali metal sulfate, alkali metal sulfite, alkali metal sulfide and/or tantalum sulfide.

6. The process according to claim 1, wherein the grain-refining agent is $Na_2SO_4$.

7. The process according to claim 1, wherein the grain-refining agent is metered in from 2 to 50 identically sized portions.

8. The process according to claim 1, wherein the reduction is carried out semi-continuously, with the diluting salt being introduced into a reactor and said valve metal compound and said alkali metal being metered in alternately, with the quantity of said valve metal compound which is metered in, in each case corresponding in stoichiometric terms to a multiple of the quantity of the alkali metal which is metered in.

9. The process according to claim 1, wherein the grain-refining agent is in each case metered in together with said valve metal compound.

10. The process according to claim 1, wherein the quantity of said valve metal compound and grain-refining agent which is in each case metered in is increased proportionally to the quantity of diluting salt in the reactor, which has been increased by the reduction, or the metering frequency is increased accordingly, with the quantity of valve metal compound per portion metered in being lowered, towards the end of the reduction, to the stoichiometric quantity of alkali metal metered in.

11. The process according to claim 2, wherein the alkali metal used is Na, K or mixtures or alloys thereof.

12. The process according to claim 11, wherein the grain-refining agent is a sulfur-containing compound, a phosphorus-containing compound, a boron-containing compound and/or a silicon-containing compound.

13. The process according to claim 12, wherein the grain-refining agent is sulfur, alkali metal sulfate, alkali metal sulfite, alkali metal sulfide and/or tantalum sulfide.

14. The process according to claim 13, wherein the grain-refining agent is $Na_2SO_4$.

15. The process according to claim 14, wherein the grain-refining agent is metered in, in at least two portions.

16. The process according to claim 15, wherein the grain-refining agent is metered in from 2 to 50 identically sized portions.

17. The process according to claim 1, wherein the grain-refining agent is a phosphorus-containing compound, a boron-containing compound and/or a silicon-containing compound.

18. The process according to claim 1, wherein the grain-refining agent is present in a quantity of 0.01 to 2 weight % based on the sum of the quantities of valve metal compound, grain-refining agent, alkali metal and diluting salt.

19. The process according to claim 16, wherein the grain-refining agent is present in a quantity of 0.02 to 0.4 weight % based on the sum of the quantities of valve metal compound, grain-refining agent, alkali metal and diluting salt.

20. A process for producing valve metal powders which have a high BET surface area of at least 1.5 $m^2/g$ which comprises reducing a valve metal compound with an alkali metal in the presence of a diluting salt, wherein the reduction takes place in the presence of a grain-refining agent which is metered in 2 to 50 identically sized portions and wherein between metering in the portions of said grain-refining agent at least a portion of said alkali metal is added.

* * * * *